United States Patent [19]
Stidsen

[11] Patent Number: 4,861,062
[45] Date of Patent: Aug. 29, 1989

[54] COVERING HOOD FOR HITCH BALLS

[76] Inventor: Poul Stidsen, Toftegaardsvej 10, DK-8370 Hadsten, Denmark

[21] Appl. No.: 153,614

[22] Filed: Dec. 17, 1987

[30] Foreign Application Priority Data

Dec. 17, 1986 [DK] Denmark .............................. 6073/86

[51] Int. Cl.⁴ ............................................. B60D 1/06
[52] U.S. Cl. .................................................. 280/507
[58] Field of Search ............... 280/507, 511, 512, 513, 280/504; 150/52 R, 52 K, 52 L; 70/158, 159, 237, 258; 292/341.14, DIG. 2, DIG. 10

[56] References Cited

U.S. PATENT DOCUMENTS

| 1,401,873 | 12/1921 | Buller | 280/512 |
| 2,446,347 | 8/1948 | Walkowiak | 280/507 |
| 2,517,176 | 8/1950 | Brock | 280/507 |
| 2,618,489 | 11/1952 | Bishop | 280/507 |
| 3,228,445 | 1/1966 | Mayotte | 280/507 |
| 4,738,293 | 4/1988 | Ostrom | 150/52 R |

FOREIGN PATENT DOCUMENTS

| 520454 | 6/1921 | France | 280/512 |
| 1493555 | 7/1967 | France | 280/507 |
| 2426583 | 1/1980 | France | 280/507 |
| 759343 | 8/1980 | U.S.S.R. | 280/512 |
| 1023855 | 3/1966 | United Kingdom | 280/507 |

Primary Examiner—John A. Pekar
Attorney, Agent, or Firm—Antonelli, Terry & Wands

[57] ABSTRACT

For covering hitch balls on the hitch systems of cars a loose covering hood is usually placed over the hitch ball which may easily be lost if it is loose, or create a noise if it is suspended in a chain, when the ball is being used. To avoid these problems two semi-spherical shells are pivotally fastened to the hitch rod right below the hitch ball, such that they are pivotal from a covering position closed about the hitch ball to opposite projecting positions, in which the hitch ball is uncovered. On already existing hitch systems the shells are easily mountable by a simple clamp fitting, which is even well suited to be fixed on a conical hitch ball rod.

10 Claims, 2 Drawing Sheets

U.S. Patent  Aug. 29, 1989  Sheet 1 of 2  4,861,062
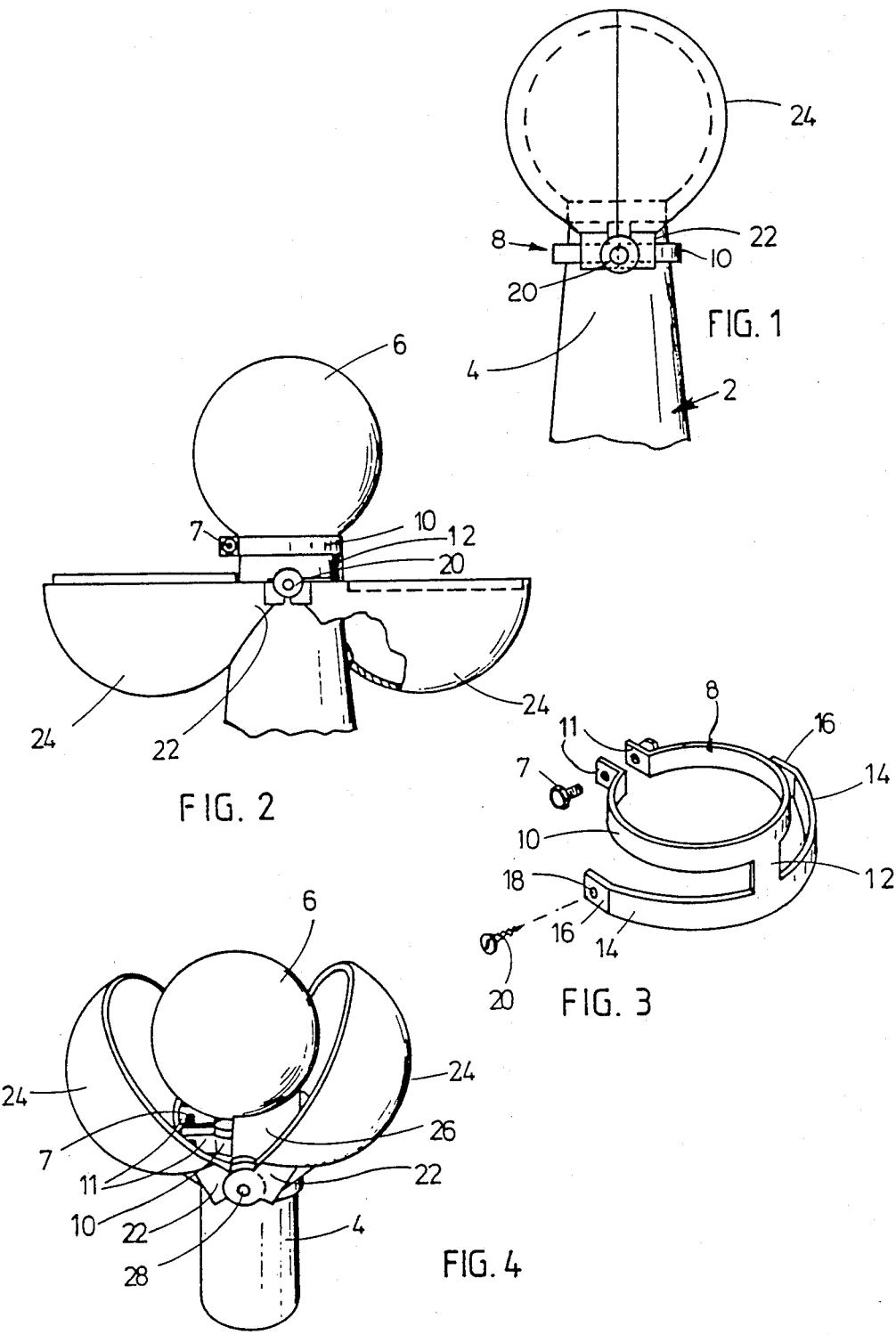

COVERING HOOD FOR HITCH BALLS

BACKGROUND OF THE INVENTION

The present invention relates to a covering hood for hitch balls on the hitch gear of a car for aftercoupled trailers, caravans, etc. These hitch balls should be slightly greasy in order to function satisfactorily, and as they are normally placed freely accessible at the rear end of the car there is a great risk for the user of the car of being smudged by the hitch ball, especially when loading or unloading goods from the trunk of the car. Therefore it is preferred to cover the hitch ball by means of a covering hood when the ball is not being used.

However, it so occurs that the known covering hoods only partially solve the associated problems, as the hoods may very easily disappear if they are loosely mounted, while they may remain in place when provided with connecting chains to the hitch gear, but when the hood is mounted, the chain may make a noise, and when the hitch ball is being used, the dangling hood may make a noise. At any rate it has been observed that a very large number of users abandon a systematic use of the covering hood and thereby choose to leave the hitch ball practically greaseless, which may counteract the smudging but is certainly not ideal for the function of the hitch gear.

It is the purpose of the invention to provide a covering hood which is operable and arranged in a manner which is so simple and appropriate that it is practically sure that it will be used by any user, such that the hitch ball may be kept appropriately greased without any considerable practical inconvenience to the user, be it directly or indirectly.

The covering hood according to the invention is particular in that it comprises two half bowl members, each being pivotally fastened relative the connecting structure between the ball and the vehicle so as to be pivotable between a closed position, in which the half bowl members enclose at least the major part of the ball, and an open position in which they are positioned projecting outwards from the connecting rod well below the level of the hitch ball. In the folded-out position of the bowl, the hitch ball will thus be freely accessible for connecting the trailer, but the half bowls will hereby remain in a fixed pivotal connection with the hitch gear and thus not in, for example, a loose chain connection therewith, such that the folded-out bowl portions will not cause any noise inconvenience during driving.

When the user has hitched off the trailer, it is merely necessary to fold up the bowl portions about the hitch ball, but this is a very simple operation, as the half bowls are already mounted and are merely required to be pivoted upwards for covering the greased hitch ball. In being folded out to opposite sides of the ball the half bowls will visually call for being closed again after use of the ball.

The handling of the covering hood will thereby be so simple that is will appear natural to any user to open and close the half bowl members, when coupling and un-coupling the trailer, respectively, and moreover the hood will present no noise problems during driving in neither closed nor open condition.

It should be mentioned that it has previously been suggested to provide for a cover shield member, which is pivoted to the vehicle or to some special hitch gear so as to be pivotal between a folded down, rearwardly protruding position and a folded up position, in which it covers the top, rear and lateral sides of the hitch ball. It is a special feature of this invention that the covering hood, whether including two half parts of only one such shield member, will be mountable directly on the hitch ball rod immediately underneath the hitch ball, viz. with the use of a clamp ring secured to the ball rod in a position, in which the top of the clamp ring engages the lower side of the ball just around the ball rod. In many hitch gears the outer end of the ball rod is conical, and, with the use of the clamp ring, it will be possible to mount the pivotal cover bowl or bowls universally on the various types of hitch gears, also those having conical ball rods, since the clamp ring will be fixable to the ball rod in a stable manner when the ring engages the underside of the bowl, particularly when the ball rod is conical. Thus, the height position of the pivot means of the said cover bowl or bowls relative the hitch ball will be well defined even for different hitch gears, such that it is possible hereby to design a hood structure which is universally applicable.

The invention is described in more detail with reference to the accompanying drawing.

BRIEF DESCRIPTION OF THE DRAWINGS

FIG. 1 is a plan view of a first embodiment of a covering hood according to the present invention in a closed position;

FIG. 2 is a plan view of the covering head and hitch ball of FIG. 1, with the covering hood in an open position;

FIG. 3 is a perspective view of a clamping ring for the covering hood of FIG. 1;

FIG. 4 is a perspective view of another embodiment of a covering hood in accordance with the present invention;

DETAILED DESCRIPTION OF THE INVENTION

Figure 5:
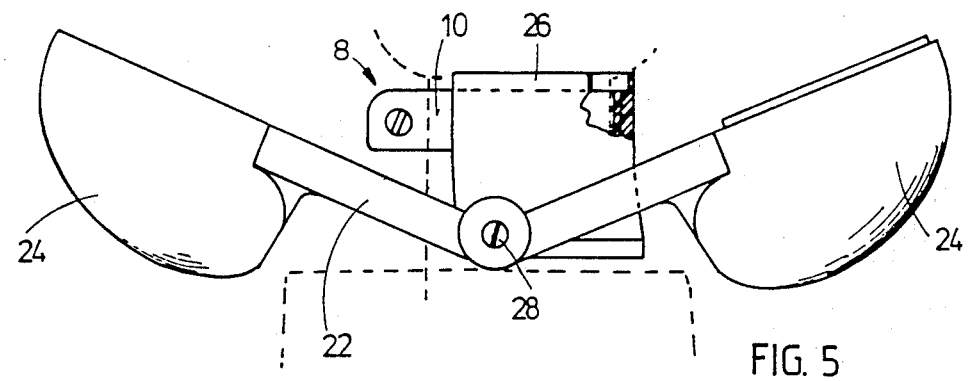
FIG. 5 is a plan view of yet another embodiment of the covering hood of the present invention in an open position.

Referring now to the drawings, wherein like reference numerals are used throughout the various views to designate like parts and, more particularly, to FIGS. 1–3, according to these figures, an outer end of a normal hitch comprises a hitch rod generally designated by the reference numeral 2 having a upwardly bent end portion 4, which is provided at its top with a ball 6, having a standard diameter, with a thickness or diameter of the end portion 4 where this being connected to the ball is of standard dimensions, while the end portion may otherwise be cylindrical or, as shown, downwardly conically expanding.

At the upper end of the end portion 4, right below the ball 6 is fastened, by a clamping screw 7, a ring fitting generally designated by the reference numeral 8 having a clamp ring 10 with end portions 11 for receiving the clamping screw 7 and with a downwardly projecting plate portion 12 which continues outwards to both sides into arm portions 14 that are bent somewhat outwards relative to the clamp ring 10. The arm portions 14 end in flat plate portions 16, which are mutually parallel and are provided with holes 18, which are placed diametrically opposite to each other on a diameter through the central axis of the end portion 4.

The holes 18 serve to receive self-cutting or self-tapping screws 20 which function as pivot pins for the lower ends of side arm portions 22 projecting downwardly from a pair of widely semi-spherical shells 24. The shells 24, preferably cast in plastic material, are mainly of equal shape, though such that the ends of the arm portions 22 of one shell may fit over the end portions of the arms of the other shell 24, whereby the shells may be fastened in a jointly hinged manner to the arm portions 14 by the screws 20, and, preferably, by hinge bushings which may be clamped tightly by using the screws 20 and yet allow a reasonably easy pivotability of the shells 24.

Hereby the shells 24 are pivotable between a closed position (FIG. 1) enclosing the hitch ball 6, and an open position (FIG. 2) uncovering the hitch ball and make it usable according to its purpose. The shells 24 are preferably provided with edge portions which face each other and which, at the closing of the shells 24, engage each other frictionally or with snap lock action, such that the shells 24 are reasonably stabilized in their closed condition, though, of course, easily openable therefrom.

As the hinge areas 18,20 are situated somewhat below the lower end of the ball 6, the shells 24 in the opened position, will be correspondingly situated entirely below the ball 6, whereby they will not obstruct the normal use of the hitch ball as shown most clearly in FIG. 2.

The use of a clamp strap 10, dimensioned so as to fit about the area of transition between the end portion 10 and the ball 6, is of importance in that the clamp fitting 8 will thereby be mountable in an appropriate manner on all existing standard hitch assemblies, regardless of whether the end portion 4 is cylindrical or more or less conical. The clamping may of course be affected by a clamp ring flush with the hinge axis of the semispherical shells 24, but as this axis should be situated somewhat below the ball 6, the ring should hereby, in order to be universally usable, be adapted also for stable clamping on a conical base portion, which is a disadvantageous mounting condition.

It will of course be a relevant possibility to provide hinge pins directly on the rod end portion 4 for providing the pivot axis of the half bowls 24, for example, pins welded to the rod, which will be especially relevant in connection with newly produced hitch gears.

The embodiment shown in FIG. 5 is basically of a similar design, but here even the ring fitting 8 is made of plastic, whereby the arm portions of FIG. 3 are substituted by a nearly half cylindrical shell portion or member 26, which projects both upwardly and downwardly from the clamp ring portion 10 so as to constitute a means for engaging the lower side of the ball 6. The shell portion or member 26 is integrally provided with opposed outwardly protruding pins 28, which, in a manner not shown, are slotted through a slightly widened outer head portion so as to be resiliently diametrically compressible for receiving with holding action the respective hinge holes of the arms 22 of the bowl members 24.

Figure 6:
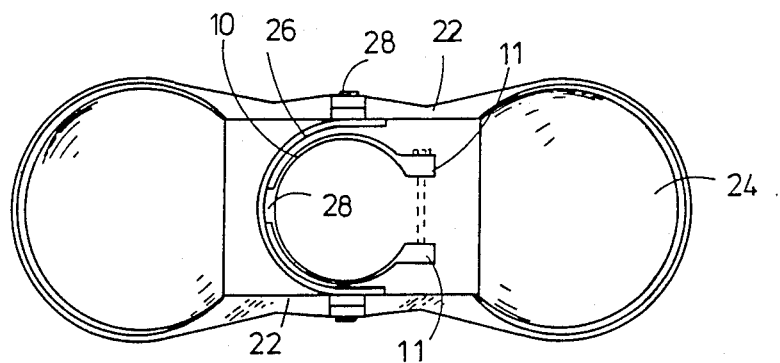
FIG. 6 is a top plan view of the covering hood of FIG. 5.

An entirely similar design, though with an increased length of the arm portions 22, is illustrated in FIGS. 5 and 6. Particularly from FIG. 6 it will be seen that the clamp ring portion 10 is coherent with the half cylindrical shell portion 26 through a connector portion 28 opposite to the end portions 11 of the clamp ring 10, while the latter is otherwise free of the shell 26. Thus, the clamp ring portion 10 may be clamped about hitch rods 2 of different diameters without the distance between the opposed pivot pins 28 being changed.

The shell portion 26 extends over slightly more than 180° of arc for ensuring a fully stabilizing engagement with the underside of the ball 6 even when the clamp ring 10 is mounted on a conical end of the hitch rod 2.

The covering hood according to the invention will be mountable on the hitch rod 2 such that the opposed bowl members 24 are pivotable from and to their closed position by a movement crosswise to the length direction of the vehicle, whereby the two bowl members 24 are equally important for covering the front side and the respective opposed lateral sies of the hitch ball 6. However, the hood structure may also be oriented such that the bowl members 24 are pivotable in the longitudinal vertical plane of the vehicle, such that one bowl member will cover the rear side of the ball 6 while the other will cover the front side thereof. In practice it is of course the rear ball side which should be covered first of all, and on that account the foremost bowl member may be omitted. Even in that case the present invention is very advantageous in providing for a structure which is safely mountable even on a conical hitch ball rod member, i.e. universally applicable also for the holding of just a single cover bowl member.

Figure 7:
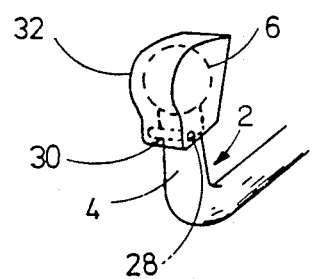
FIG. 7 is a perspective view of a further embodiment of the covering hood of the present invention with only one bowl member.
Figure 8:
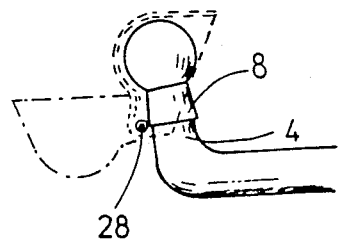
FIG. 8 is a plan view of the covering hood of FIG. 7 depicting the open and closed positions thereof.

This aspect of the invention is illustrated in FIGS. 7 and 8, in which there is still mounted about the upper end 4 of the hitch rod 2 a clamp ring structure 8 topwise abutting the underside of the ball 6 and connected or provided with a carrier portion 30 for opposed pivot pins 28 serving to pivotally hold a bowl member 32, which is longitudinally pivotable between a rearwardly projecting folded down position (FIG. 8, dot-and-dash-lines) and a folded up ball covering position, in which it projects rearwardly well beyond the transverse middle plane of the hitch ball 6 so as to widely cover the ball 6 both at the rear, at the top and at the lateral sides thereof.

While it may thus be sufficient to use but a single bowl member as already known in the art it will still be appreciated that it is a specific advantage of the present invention that such a single bowl member may be provided in connection with a stanard unit mountable on practically all commercial hitches by virtue of the clamp ring 8 being mountable on the rod 2 immediately underneath the hitch ball 6, in engagement with the underside of the ball 6, whereby it is unimportant whether the hitch ball rod 2 is cylindrical or conical. This, when the location of the clamp ring 8 and therewith the location of the pivot means of the bowl member or members 24 will be known, despite the size and conicity of the hitch ball rod 2, it will be possible to design the bowl member or members 24 such that the standard ball 6 will be covered as desired whenever the bowl member or members 24 is/are swung into an upright position, while in a folded down position the bowl member or members 24 will leave the high ball 6 freely accessible for cooperation with the hitch head of the trailer.

I claim:

1. A covering hood for hitch balls on a hitch rod of a vehicle for after-coupled trailer means, the covering hood comprising two half bowl members pivotably fastened to a connection structure between a hitch ball and the vehicle so as to be pivotal between a closed position enclosing a major part of the hitch ball, and an open position in which the bowl members are situated projecting outwardly to opposite sides in a level below the hitch ball.

2. A covering hood according to claim 1, wherein the bowl members are pivotal about a common axis, the bowl members being pivotally connected to a carrier portion including a clamp ring shaped so as to be mountable about the hitch rod right below the hitch ball and with a top portion abutting a lower side of the hitch ball.

3. A covering hood according to claim 2, in which the common axis is located substantially spaced beneath said top portion.

4. A covering hood according to claim 2, in which the carrier portion includes a half cylindrical member partly encircling the clamp ring and pivot means for the bowl members located at opposite sides, while being associated with the clamp ring only at a restricted area midway between the opposite pivots, and wherein the clamp ring includes end portions projecting laterally from the half cylindrical carrier member.

5. A covering hood structure for hitch balls on a hitch of a vehicle for after-coupled trailer means, the covering hood structure comprising a clamp ring member adapted for mounting about a ball of a rod of the hitch immediately below a head of the ball rod, upper engagement means for supporting said clamp ring member against an underside portion of the ball and at least one bowl member pivotally secured to said clamp ring member so as to be pivotal about at least one axes located spaced beneath said engagement means between an open position, in which the at least one bowl member is pivoted away from the ball and located substantially beneath a bottom level of the ball, and a closed position, in which the ball is substantially covered by the at least one bowl member.

6. A covering hood structure according to claim 5, wherein at least two bowl members are provided and are mutually pivotable with respect to each other.

7. A covering hood structure according to claim 5, wherein said upper engagement means are formed as a part of said clamp ring member.

8. A covering hood structure according to claim 5, wherein said upper engagement means are mounted on said clamp ring member.

9. A covering hood structure according to claim 5, wherein said at least one bowl member is mounted so as to be pivoted toward and away from the rear portion of the bowl.

10. A covering hood structure according to claim 5, wherein said at least one bowl member is pivotally secured to said clamp ring member so as to be pivotal about a plurality of axes located spaced beneath said engagement means.

* * * * *